Figure 6:
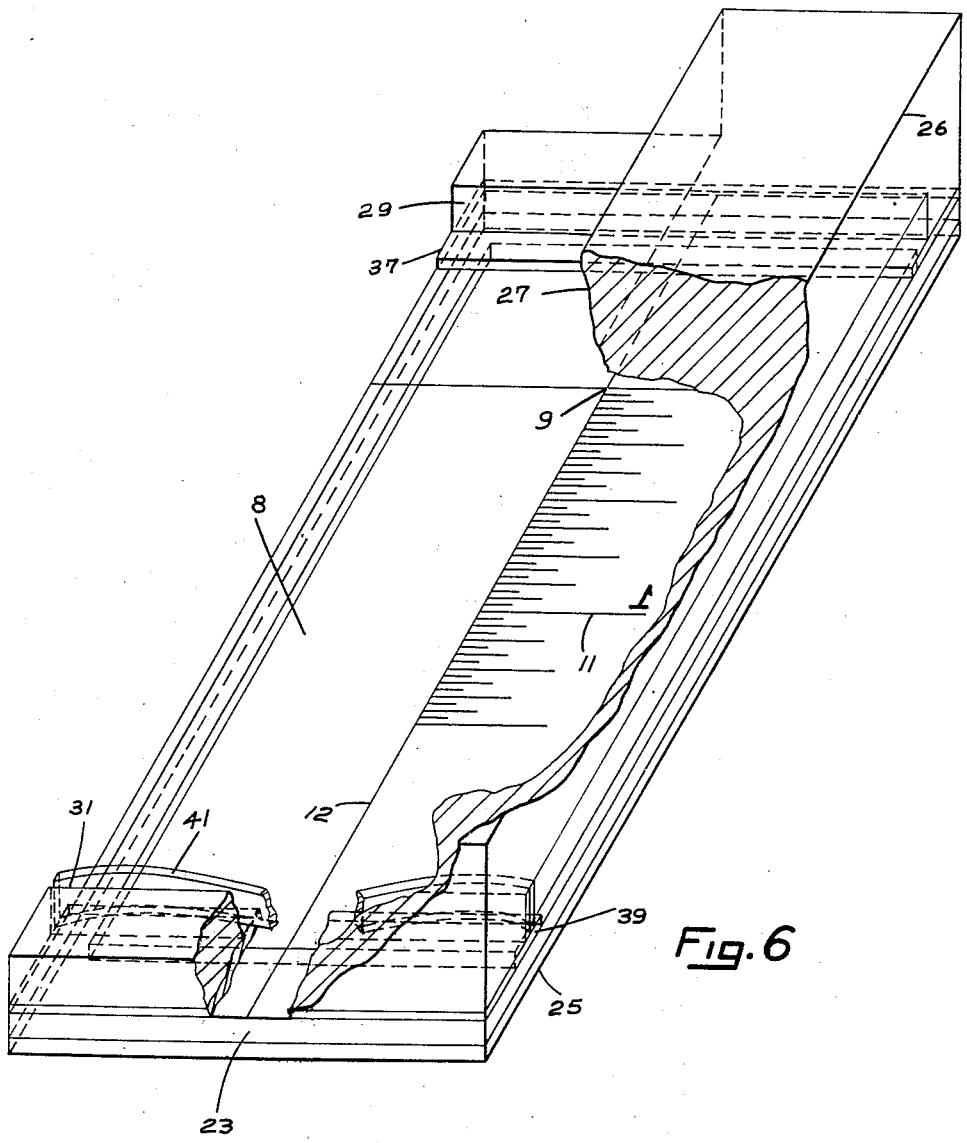

Jan. 11, 1949.  W. B. THOMSON  2,458,749
APPARATUS FOR APPROXIMATELY SQUARING CIRCLES
Filed July 8, 1948  3 Sheets-Sheet 1
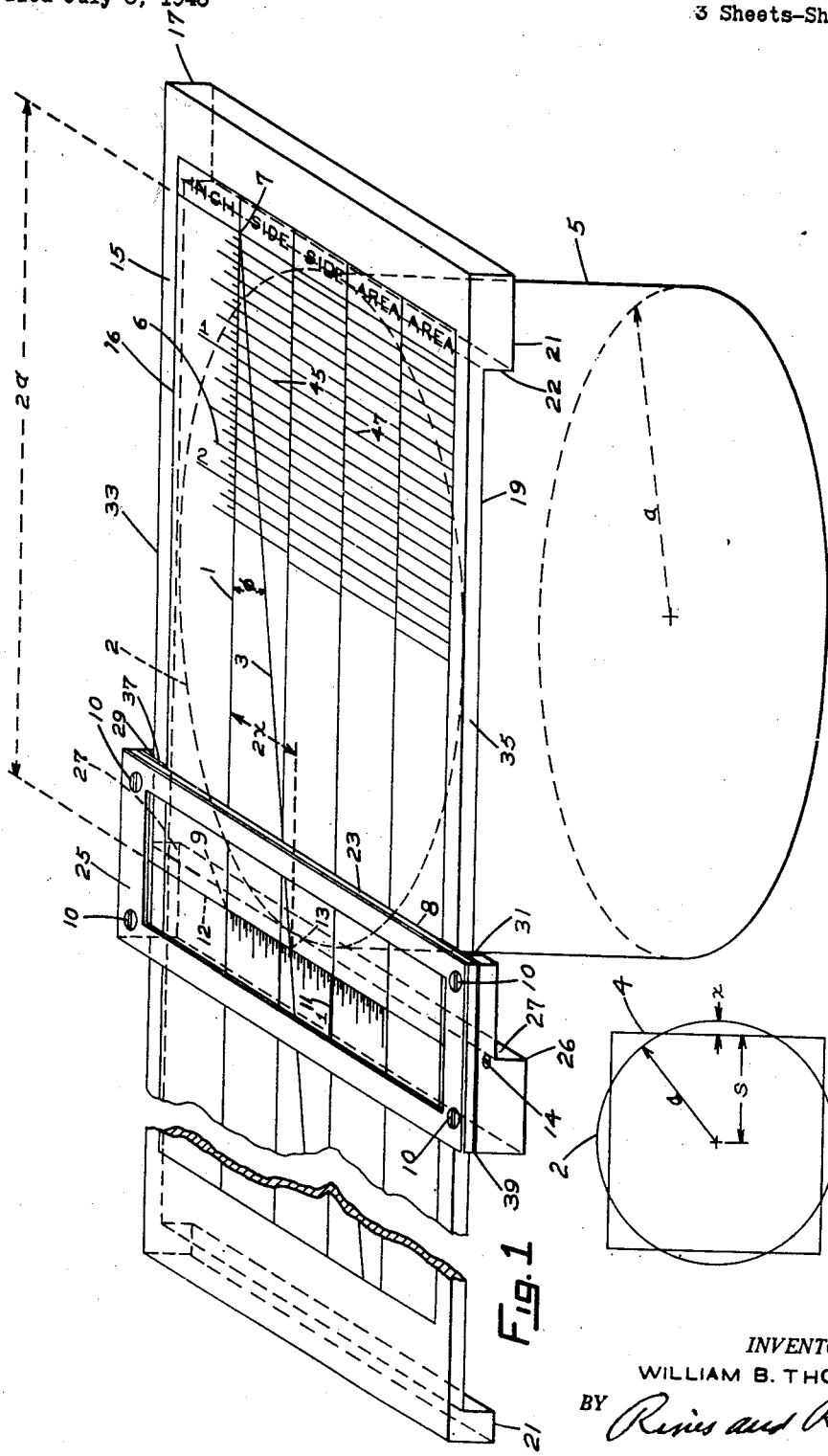
INVENTOR.
WILLIAM B. THOMSON
BY
ATTORNEYS

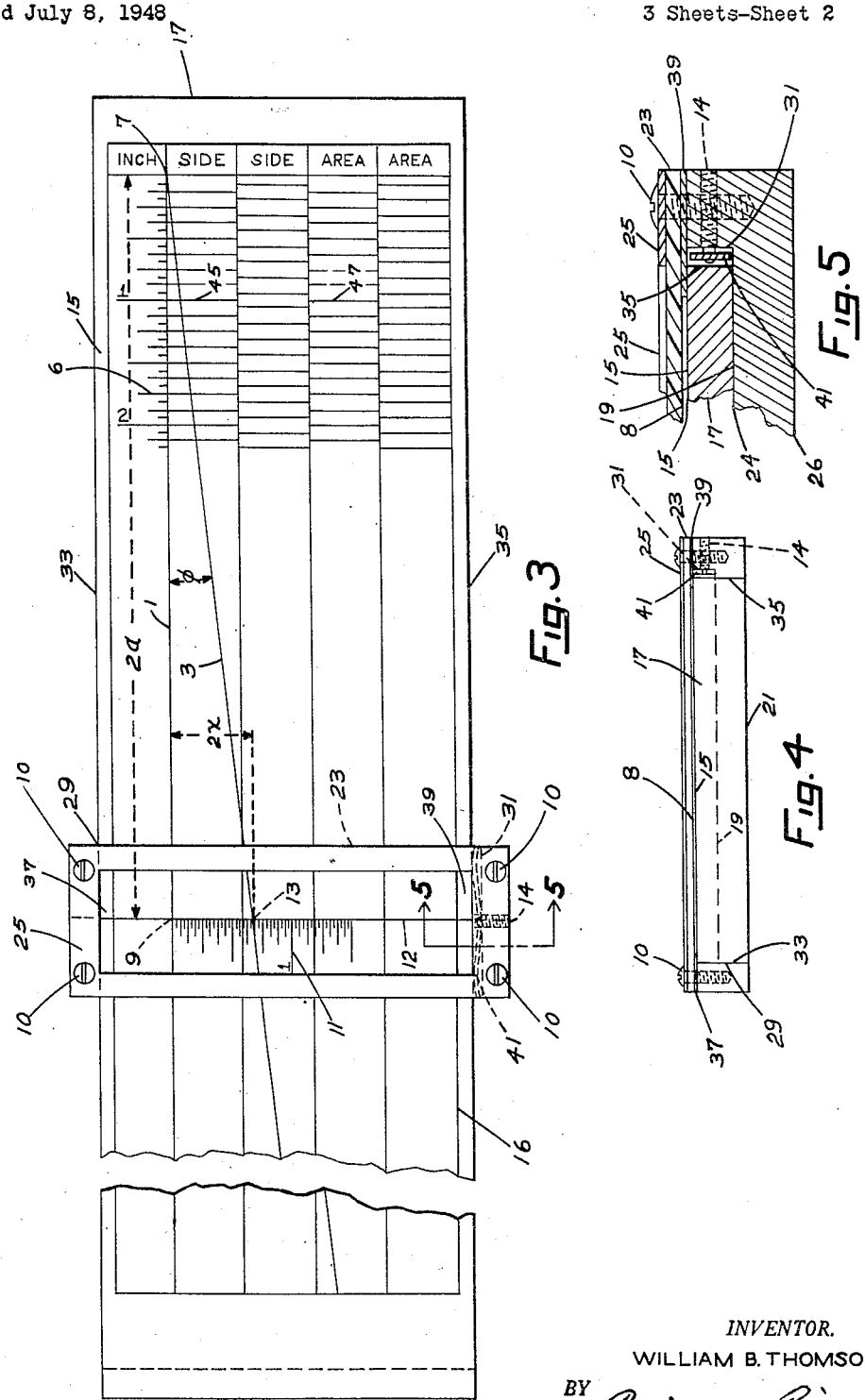

Jan. 11, 1949.   W. B. THOMSON   2,458,749
APPARATUS FOR APPROXIMATELY SQUARING CIRCLES
Filed July 8, 1948   3 Sheets-Sheet 3

INVENTOR.
WILLIAM B. THOMSON
BY *Rines and Rines*
ATTORNEYS

Patented Jan. 11, 1949

2,458,749

UNITED STATES PATENT OFFICE 2,458,749

APPARATUS FOR APPROXIMATELY SQUARING CIRCLES

William Balvaird Thomson, Boston, Mass.

Application July 8, 1948, Serial No. 37,594

7 Claims. (Cl. 235—61)

1

The present invention relates to approximative circle-squaring, and more particularly to apparatus for determining the length of the side of the square having substantially the same area as any given circle. Such a square will be referred to hereinafter as the equivalent square.

An object of the invention is to provide a new and improved instrument for approximately squaring the circle.

Other and further objects will be explained hereinafter and will be more particularly pointed out in the appended claims.

The invention will now be described more fully in connection with the accompanying drawings, in which Fig. 1 is a perspective, partly broken away, of a preferred instrument embodying the present invention, shown applied to a circular cylinder for the purpose of determining the length of the side of the equivalent square having approximately the area of the circular base of the cylinder and showing also mathematical symbols as an aid to an understanding of the principles underlying the invention; Fig. 2 is a diagram illustrative of the principles and explanatory of the mathematical symbols; Fig. 3 is a plan of the instrument shown in Fig. 1, also partly broken away, and showing also the mathematical symbols; Fig. 4 is an end view of the instrument shown in Fig. 1, looking from the left; Fig. 5 is a section of the slidable indicator member of the preferred instrument upon a larger scale, taken upon the line 5—5 of Fig. 3, looking in the direction of the arrows; and Fig. 6 is an underside perspective of this slidable indicator member, partly broken away, and upon a larger scale.

The preferred instrument of the present invention may comprise a relatively large base member 17 and a relatively small indicator member 23. These members 17 and 23 are both shown as rectangular plates, disposed in parallel planes at right angles to each other, and relatively slidable in these parallel planes along a direction parallel to the longer side edges 33 and 35 of the rectangle of the base member 17. For definiteness, the base member 17 will be referred to as a stationary member and the indicator member 23 as a slidable member.

The stationary member 17 and the slidable indicator member 23 are provided with right-angularly disposed straight-line scales 1 and 12, respectively parallel to the longer sides of the respective rectangles. The base member 17 is provided also with a further straight line 3 inclined to the straight-line scale 1 at an angle $\phi$, the nature of which will be explained more fully here-

2 inafter. The straight-line scale 1, with its calibrations 6, the inclined line 3, the column headed "Inch" and the columns described more fully hereinafter may be disposed in a rectangle 16, in the plane of the upper or front face 15 of the base member 17.

As shown at 6 and 11, respectively, the scales 1 and 12 may be calibrated linearly in the same units, for example, inches. The scales 1 and 12 may be provided with suitable numerals to indicate the values corresponding to the respective calibrations 6 and 11. In the column headed "Inch" of the scale 1, for example, the numerals 1 and 2 indicate 1 and 2 inches, respectively.

The stationary base member 17 is shown provided with end portions 21 projecting downward below its rear or lower face 19. The right-hand projecting end portion 21 is shown provided with a plane face 22, parallel to the shorter sides of the rectangle of the stationary base member 17 and perpendicular to the planes of the rectangles of the base member 17 and the indicator member 23. Along its left-hand longer side, the indicator member 23 is provided with a similarly projecting portion 26 having a plane face 27 parallel and disposed opposite to the plane face 22. The planes of the faces 22 and 26 are therefore perpendicular to the direction of the slidable movement of the indicator member 23.

The point of intersection of the straight-line scale 1 and the inclined straight line 3 is preferably disposed in the plane of the face 22. As the straight-line scale 1 may be calibrated to read zero at the point 7 of its intersection with the inclined straight line 3, in the plane of the face 22; this point 7 may be termed the origin of the straight-line scale 1. The straight-line scale 12 is preferably disposed in the plane of the face 27. As the straight-line scale 12 may similarly be calibrated to read zero at the point 9 of its intersection with the straight-line scale 1, point 9 may similarly be termed the origin of the straight-line scale 12. The reading indicated by the point 13 on the straight-line scale 12 represents the distance between the origin 9 of the scale 12, which is the foot of the perpendicular to the straight-line scale 1 through the point 13, and the point 13 of intersection of the perpendicular with the inclined straight line 3. This reading will be represented by the quantity $2x$.

At different positions of slidable adjustment of the indicator member 23, the point 9 of the straight-line scale 12 will indicate in the column headed "Inch" different readings of the calibrated values of the straight-line scale 1. Since the origin 7 of the straight-line scale 1 and the point 9 of the straight-line scale 12 are disposed in the respective planes of the parallel faces 22 and 27, these readings will obviously always represent the distance between the plane face 22 of the stationary base member 17 and the plane face 27 of the slidable indicator member 23 in all positions of slidable adjustment of the indicator member on the stationary base member 17. The calibrations in the column headed "Inch" therefore represent the diameters of circles tangent to the parallel plane faces 22 and 27 corresponding to different positions of adjustment of the plane face 27 toward and from the plane face 22.

Assuming, as an illustration, that it is desired to determine the length $2s$ of the side of the equivalent square having substantially the same area as the cross-sectional area of a circular cylinder 5 of radius $a$, the face 22 of the right-hand projecting end portion 21 of the stationary member 17 may first be caused to engage a point of the circumference of the cylinder 5, and the indicator member 23 may then be slidably adjusted until a diametrically opposite point of the circumference becomes engaged by the parallel face 27 of its projecting portion 26, as shown in Fig. 1. The reading in the column headed "Inch" of the calibrated straight-line scale 1 indicated by the point 9 will therefore measure the value of the diameter $2a$ of the circular base of the cylinder 5. From this reading $2a$ is subtracted the reading $2x$, indicated by the point 13 on the scale 12, representing the distance from the origin 9 of the scale 12 to the point 13 of intersection of the scale 12 with the inclined straight line 3. The value $2a - 2x$ obtained by this subtraction, assuming the suitable value for the angle $\phi$ of inclination between the straight-line scale 1 and the straight line 3, as will presently be demonstrated, is the length $2s$ of the side of the desired equivalent square.

If the radius $a$ of the circular base of the cylinder 5 is 4 inches, for example, the reading of the scale 1 indicated by the origin 9 of the scale 12 will be $2a$ or 8 inches. Assuming the proper value of the angle $\phi$, the reading $2x$ of the scale 12 indicated by the point 13 will then be found to be 0.91 inch. The difference between $2a - 2x$ is therefore 7.09 inches. This is the length $2s$ of the desired equivalent square.

In proof of the fact that the length $2s$ of the side of the equivalent square may be obtained in this manner when the straight-line scale 1 and the straight line 3 are inclined to each other at an angle $\phi$ of suitable value, reference may now be made to Fig. 2, representing, concentrically arranged, a circle 2 of any desired radius $a$, and the equivalent square 4 having approximately the same area as that of the circle 2, the half-side of which is represented at $s$. The distance $x$, as shown in Fig. 2, represents the difference between the radius $a$ of the circle 2 and the half-side $s$ of the square 4:

$$s = a - x$$

Since the area of the circle 2 is $\pi a^2$, where $\pi$ is the incommensurable quantity $3.14159265+$, representing the ratio of the circumference to the diameter of a circle, and since this is equal, by hypothesis, to the area $4s^2$ of the equivalent square 4, $$\pi a^2 = 4s^2$$

wherefore $$s = \tfrac{1}{2}\sqrt{\pi}\, a$$

These equations furnish data for determining the angle $\phi$ of inclination of the straight line 3 to the straight-line scale 1. From an inspection of Fig. 1 or Fig. 2, $$\tan \phi = \frac{2x}{2a}$$

$$= \frac{a - s}{a}$$

$$= 1 - \tfrac{1}{2}\sqrt{\pi}$$

$$= 0.11377307+,$$

wherefore $$\phi = 6°29'26''$$

According to the present invention, therefore, the length $2s$ of the side of the equivalent square 4 having the same area as that of a circle 2 of radius $a$ may be determined. All that is necessary in order to solve this problem, after adjusting the indicator member 23 along the base member 17 until the circle is tangent to the parallel faces 22 and 27, is to measure, in the column headed "Inch," along the straight-line scale 1, from its origin 7 to the origin 9 of the straight-line scale 12, the calibrated distance $2a$, representing the diameter of the circle 2, then to measure the calibrated distance $2x$ from the origin 9 of the straight-line scale 12 to its point 13 of intersection with the inclined line 3, and then to subtract the measurement $2x$ from the measurement $2a$.

The preferred instrument for solving this problem will now be described more fully.

It has been stated that the parallel faces 22 and 27 are respectively provided upon one of the projecting end portions 21 of the base member 17 and the projecting portion 26 of the indicator member 23. For purposes of assembly, it is desirable that at least one of these projections be detachable. According to the illustrated embodiment of the invention, the end portions 21 are shown integral with the base member 17 and the projecting portion 26 is shown separate from the indicator member 23. The rectangular indicator member 23 is shown interposed between the projecting portion 26 therebelow and a cover member 25 thereabove. The projecting portion 26 and the cover member 25 are shown of the same rectangular configuration as that of the indicator member 23. The cover member 25, the indicator member 23 and the projecting portion 26 may be secured together in any desired way, as by means of screws 10. The cover member 25 is shown in the form of a frame provided with a rectangular opening through which to view the scale 12 of the indicator member 23.

The base member 17 is slidably received in a suitably shaped recess of the projecting portion 26. In transverse section, this base-member-receiving recess is shown U-shaped, the bottom wall of the U being indicated at 24 and the side walls of the U at 29 and 31. The lower or rear face 19 of the base member 17 contacts slidably with the bottom wall 24 of the U-shaped recess. The side edge 33 of the base member 17 similarly contacts slidably with the side wall 29 of the U-shaped recess. The side edge 35 of the base member 17, however, is shown separated slightly from the side wall 31 of the U-shaped recess in order to provide a space for receiving a leaf-spring clip 41. The leaf-spring clip 41 is intermediately fastened, as by means of a screw 14, to the side wall 31 of the U-shaped recess, and the ends of the leaf-spring clip 41 bear against the side edge 35 at the base member 17. The leaf-spring clip 41 thus serves to hold the indicator member 23 snugly upon the base member 17 in any position of its slidable adjustment.

Accidental detachment of the indicator member 23 from the base member 17 at the limits of its slidable movement is prevented by the projecting portion 26 of the indicator member 23 engaging the projecting end portions 21 of the base member 17.

It has been stated that the calibrations 6 of the straight-line scale 1 and the inclined line 3 are provided in the plane of the upper or front face 15 of the base member 1. In order to minimize errors of reading due to parallax, the calibrations 11 of the straight-line scale 12 may be provided upon the lower or rear face 8 of the indicator member 23, adjacent and opposite to the front face 15 of the base member 17. In order not to hide from view the calibrations 11 of the straight-line scale 12, the indicator member 23 may be constituted of a sheet of transparent material, such as glass or plastic. The indicator member 23 could, of course, be opaque and the base member 17 could be made transparent. In either event, this construction renders it possible to position the calibrations 11 of the scale 12 upon the lower face 8 of the indicator 23 as close as may be desired to the calibrations 6 of the scale 1 and the inclined line 3 upon the upper surface 15 of the base member 17. In order to prevent the adjacently disposed faces 8 and 15 rubbing against each other during the slidable movement of indicator member 23 on the base member 17, very thin shims 37 and 39 may be interposed along the margins of the small side of the rectangle of the indicator member 23, between the upper face of the projecting portion 26 and the lower face 8 of the indicator member 23. These shims 37 and 39 are shown wide enough so that their inner edges aline with the long sides of the rectangle 16 in the upper face 15 of the base member 17. The shims 37 and 39 are shown held in place by the same screws 10 that hold the indicator member 23 between the cover 25 and the projecting portion 26.

For purposes of check, it is convenient to provide tables upon the front face 15 of the member 17 in the columns headed "Side" and "Area." These columns are shown disposed along with the column headed "Inch," the straight-line scale 1 and the inclined line 3 in the rectangle 16. The two columns headed "Side," for example, may contain tabulations of the values of the lengths 2s of the sides of the equivalent squares corresponding to the readings on the scale 1 of the circle diameters 2a, tabulated in the column headed "Inch." Corresponding to the circle-diameter reading 1 inch of the calibrated scale 1 in the table headed "Inch," as an illustration, the value 0.8862, indicating the length of the side of the equivalent square, may be tabulated at 45. The corresponding area 0.78540 of the circle or its equivalent square may be tabulated in the corresponding column headed "Area" at 47. In those cases where the reading of the instrument corresponds to a circle diameter between the calibrations of the scale 1, in the column headed "Inch," it is necessary, of course, to calculate the value of this area. The tabulations, however, afford a rough check upon the calculations.

Values of the circle diameters 2a and the lengths 2s of the sides of the equivalent squares and of the corresponding areas may be tabulated on the instrument. Such values may commence, for example, as follows:

| Diameter (2a) | Side (2s) | Area ($\pi a^2$ or $4s^2$) |
|---|---|---|
| Inches | Inches | Square inches |
| 1/16 | 0.0554 | .00307 |
| 1/8 | 0.1108 | .01227 |
| 3/16 | 0.1662 | .02761 |
| 1/4 | 0.2216 | .04909 |
| 5/16 | 0.2769 | .07670 |
| 3/8 | 0.3323 | .11045 |
| 7/16 | 0.3877 | .15033 |
| 1/2 | 0.4431 | .19635 |
| 9/16 | 0.4985 | .24850 |
| 5/8 | 0.5539 | .30680 |
| 11/16 | 0.6093 | .37122 |
| 3/4 | 0.6647 | .44179 |
| 13/16 | 0.7201 | .51849 |
| 7/8 | 0.7754 | .60132 |

It is not essential, of course, that the calibrations corresponding to the circle diameters be provided upon the straight-line scale 1. They could equally well be provided, for example, upon any other straight line through the origin 7 and, in particular, the straight line 3. The distance between the origin 7 and the point of intersection of such other straight line with the straight-line scale 12 is as good a measure of the diameter 2a of the circle 2 as the distance between the origin 7 and the point 9. If such other straight line be calibrated linearly in units the same as the units of calibration of the straight-line scales 1 and 12, but multiplied by the secant of the angle of inclination of such other straight line to the straight-line scale 1, the values of the calibrations in the column headed "Inch" will apply to the calibrated scale of such other straight line equally well as to the straight-line scale 1.

If the straight-line 3 were graduated in this manner, for example, it would be possible to have the point 13 indicate, not only the value 2x on the scale 12, but also the value of the diameter 2a on the inclined straight line 3. The graduations of the inclined straight line 3 would be the same as the graduations of the straight-line scale 1, multiplied by sec $\phi$, but the graduations could have the same numbers associated with them as are associated with the graduations of the straight-line scale 1, as tabulated in the column headed "Inch."

Further modifications, too, will occur to persons skilled in the art, and all such are considered to fall within the spirit and scope of the present invention, as defined in the appended claims.

What is claimed is:

1. An instrument for approximately squaring a circle having, in combination, a base member having two straight lines inclined to each other at an angle $\phi$ determined by the equation $$\tan \phi = 1 - \frac{1}{2}\sqrt{\pi}$$

where $\pi$ is the ratio of the circumference to the diameter of a circle, one of the lines being linearly calibrated in predetermined units, and an indicator member movable with respect to the base member substantially parallel to one of the lines and calibrated in the same units.

2. An instrument for approximately squaring a circle having, in combination, a base member having an origin and a straight-line scale through the origin calibrated to correspond to measures of the values of the diameters of circles, and an indicator movable with respect to the base member substantially parallel to a further line through the origin and provided with a calibrated scale, the base member having also a line through the origin inclined to the further line at an angle $\phi$ determined by the equation.

$$\tan \phi = 1 - \frac{1}{2}\sqrt{\pi}$$

where $\pi$ is the ratio of the circumference to the diameter of a circle.

3. An instrument for approximately squaring a circle having, in combination, a base member having a face provided with two straight lines inclined to each other at an angle $\phi$ determined by the equation $$\tan \phi = 1 - \frac{1}{2}\sqrt{\pi}$$

where $\pi$ is the ratio of the circumference to the diameter of a circle, one of the lines being linearly calibrated in predetermined units, and an indicator member movable with respect to the base member substantially parallel to the said one line and having a face provided with a straight line at right angles to the said one line calibrated in the same units, the face of the base member being disposed adjacent and opposite to the face of the indicator member, and one of the members being transparent.

4. An instrument for approximately squaring a circle having, in combination, a base member having two straight lines inclined to each other at an angle of substantially six degrees, twenty-nine minutes, twenty-six seconds, one of the lines being linearly calibrated in predetermined units, and an indicator member movable with respect to the base member substantially parallel to the said one line and provided with a straight line at right angles to the said one line calibrated in the same units.

5. An instrument for approximately squaring a circle having, in combination, a base member having two straight lines inclined to each other at an angle of substantially six degrees, twenty-nine minutes, twenty-six seconds, one of the lines being linearly calibrated in predetermined units, and an indicator member movable with respect to the base member substantially parallel to the said one line and provided with a straight line at right angles to the said one line calibrated in the same units, the base member being provided with a table of values of the lengths of the sides of squares equivalent to circles having diameters corresponding to the calibrations of the said one line, and the said values being tabulated adjacent to the corresponding calibrations.

6. An instrument for approximately squaring a circle having, in combination, a base member having two straight lines inclined to each other at an angle of substantially six degrees, twenty-nine minutes, twenty-six seconds, one of the lines being linearly calibrated in predetermined units, and an indicator member movable with respect to the base member substantially parallel to the said one line and provided with a straight line at right angles to the said one line calibrated in the same units, the base member being provided with a table of values of the lengths of the sides of squares equivalent to circles having diameters corresponding to the calibrations of the said one line, the said values being tabulated adjacent to the corresponding calibrations, and the base member being provided also with a table of values of the corresponding areas of the circles and the equivalent squares.

7. An instrument for approximately squaring a circle having, in combination, a rectangular base member having a front face and a rear face and having projecting end portions one of which is provided with a plane face perpendicular to the plane of the rectangle and parallel to its shorter sides, a rectangular indicator member disposed at right angles to the rectangular base member and having a projecting portion having a plane face parallel to the plane face of the said one projecting end portion, the indicator member being provided with a U-shaped recess for slidably receiving the base member, the base member being provided with two straight lines inclined to each other at an angle $\phi$ determined by the equation $$\tan \phi = 1 - \frac{1}{2}\sqrt{\pi}$$

where $\pi$ is the ratio of the circumference to the diameter of a circle, one of the lines being linearly calibrated in predetermined units, and the indicator member being mounted to slide in a plane parallel to the plane of the rectangular base member substantially parallel to the said one line and being provided with a straight line at right angles to the said one line calibrated in the same units.

WILLIAM BALVAIRD THOMSON.

REFERENCES CITED

The following references are of record in the file of this patent:

UNITED STATES PATENTS

| Number | Name | Date |
|---|---|---|
| 1,200,569 | Young | Oct. 10, 1916 |
| 1,553,683 | Furbish | Sept. 15, 1925 |
| 2,300,448 | Ludwig | Nov. 3, 1942 |